United States Patent
Omura et al.

(10) Patent No.: US 8,495,541 B2
(45) Date of Patent: Jul. 23, 2013

(54) CHARACTERIZATION DEVICE AND COMPUTER PROGRAM THEREOF

(75) Inventors: Masahiko Omura, Kanagawa (JP); Takashi Nakajima, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 13/451,091

(22) Filed: Apr. 19, 2012

(65) Prior Publication Data

US 2012/0278779 A1    Nov. 1, 2012

(30) Foreign Application Priority Data

Apr. 27, 2011   (JP) ................................. 2011-099360

(51) Int. Cl.
*G06F 17/50*   (2006.01)
(52) U.S. Cl.
USPC ............................ 716/111; 716/113; 716/136
(58) Field of Classification Search
USPC .......................... 716/111, 113, 136
See application file for complete search history.

(56) References Cited

U.S. PATENT DOCUMENTS 7,614,023 B2 * 11/2009 Lang et al. ..................... 716/113

FOREIGN PATENT DOCUMENTS

| JP | 9-179888 A | 7/1997 |
| JP | 9-212541 A | 8/1997 |
| JP | 10-222545 A | 8/1998 |
| JP | 2003-218216 A | 7/2003 |
| JP | 2006-350548 A | 12/2006 |

* cited by examiner

*Primary Examiner* — Thuan Do
(74) *Attorney, Agent, or Firm* — McGinn IP Law Group, PLLC

(57) ABSTRACT

A characterization device capable of extracting the characteristic values of high-reliability hard macros at high speed. A characteristic value extraction unit calculates the delay time at measurement points within the hard macro and extracts the characteristic values by applying a slew to the signal waveform that is inputted to the hard macro and making a static path search. A dynamic verification unit verifies whether the characteristic values are adequate or not by carrying out a dynamic verification of the hard macro utilizing the characteristic values extracted by the characteristic value extraction unit. The characterization device can therefore shorten the time required to make a dynamic verification, and further is capable of extracting the characteristic values of high-reliability hard macros at high-speed.

8 Claims, 11 Drawing Sheets

OBSERVATION POINT
(USER DESIGNATED)

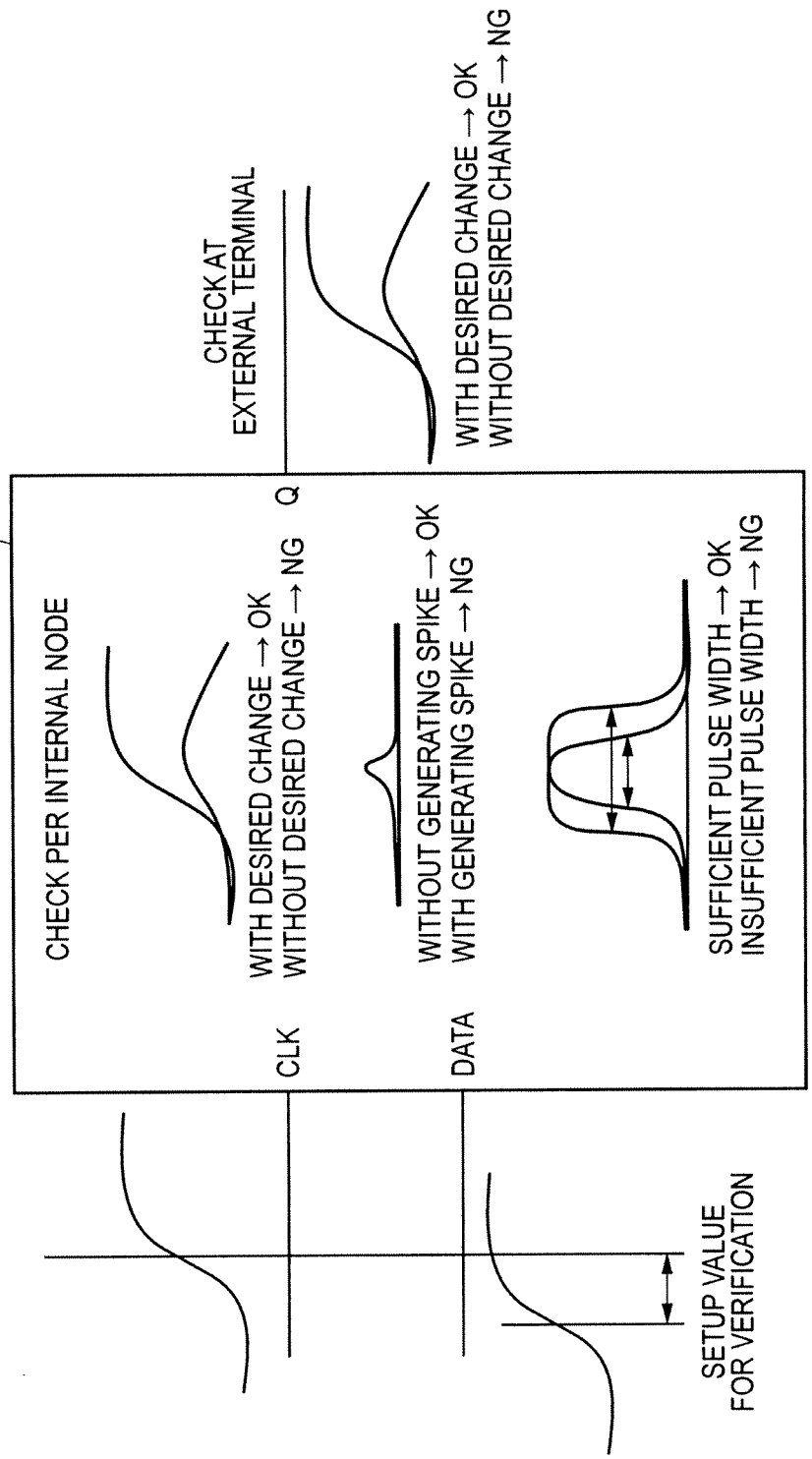

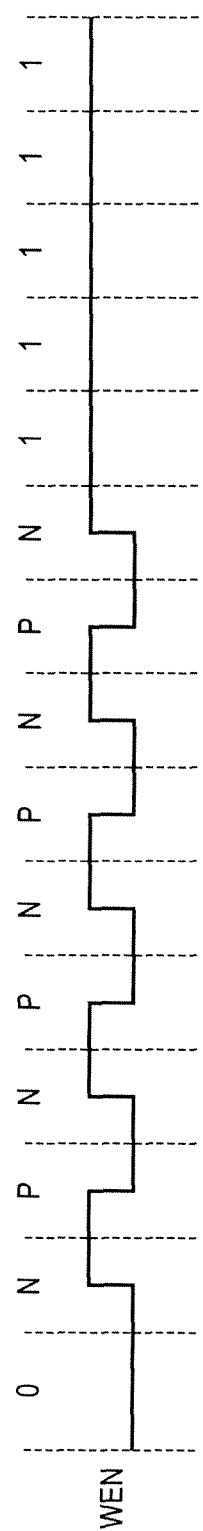

CHARACTERIZATION DEVICE AND COMPUTER PROGRAM THEREOF

CROSS-REFERENCE TO RELATED APPLICATIONS

The disclosure of Japanese Patent Application No. 2011-099360 filed on Apr. 27, 2011 including the specification, drawings and abstract is incorporated by reference in its entirety.

BACKGROUND

The present invention relates to technology for verifying logic circuits and relates in particular to a characterization device and a computer program thereof for extracting the characteristics of hard macros such as SRAM (Static Random Access Memories).

Progress made in recent years in developing semiconductor integrated circuits containing many functions as well as more advanced functions has led to the mounting of hard macros such as CPU (central processing units) peripheral I/O, and SRAM onto a single semiconductor chip. These types of semiconductor devices require a technique for characterizing (extracting characteristics) of the hard macro such as a SRAM at high speed. Technology relating to this topic is described in the patents disclosed in the following four patent documents.

The technology disclosed in Japanese Unexamined Patent Application Publication No. Hei9 (1997)-179888 has the goal of providing a timing verification method for performing timing verification with high precision and moreover with a low cost CPU. This method investigates the input time of each data signal and clock signal as well as the distortion on each input waveform, inputs the respective variables for each function corresponding to the input waveform distortion for each clock signal and data signal, and calculates the respective data signal delay times and clock signal delay times. The method then calculates the difference in arrival times between data signals and clock signals within the internal nodes of data storage elements within the logic circuits, from the input times for each data signal and clock signal and from the data signal delay time and clock signal delay time. Moreover, the method also compares the timing constraint values with the difference in arrival times, and detects timing constraint violations in the data signal and the clock signal input times.

The technology disclosed in Japanese Unexamined Patent Application Publication No. Hei10 (1998)-222545 has the goal of providing a parameterized memory circuit reduction method and logic cell library generating method for extracting parameterized memory characteristic values in a short time and with high precision. This method extracts the parasitic capacitance and parasitic resistance of the transistors in the leaf cell during generation of a net list for leaf cells from layout data for the parameterized memory, and substitutes the leaf cell into an equivalent reduced circuit. During generation of an equivalent circuit for the overall memory by combining the above described leaf cells, the method in Japanese Unexamined Patent Application Publication No. Hei10 (1998)-222545 removes those sections not affecting calculation of characteristics, and also makes reductions by simplifying sections that affect the characteristic calculation. This method then generates a net list for a circuit simulation operation including input vectors and analysis conditions, implements the circuit simulation, and based on results from that simulation automatically generates a logic cell library for calculating the characteristics.

The technology disclosed in Japanese Unexamined Patent Application Publication No. 2003-218216 has the object of measuring the input setup and hold timing values for input terminals of function macros such as memories physically located within the semiconductor integrated circuit with good accuracy. This method establishes selector circuits and FF circuits, fixes the external clock signal and external input signal timing for states at which the function macros operate normally, selects the clock terminal 2 signal for the function macro in the selector circuit, detects the timing for applying transitions in the FF circuit output while offsetting the phase of the clock measurement signals in the FF circuit. This method then observes the timing Tb for measurement clock signals at each time point, selects the input terminal signal for the function macros in the selector circuit, detects the timing for applying transitions in the FF circuit output while shifting (offsetting) the phase of the clock measurement signals in the FF circuit, observes the timing Ta for measurement clock signals at each point, and calculates the difference between the timing Ta and Tb.

The technology disclosed in Japanese Unexamined Patent Application Publication No. 2006-350548 has the object of reducing the circuit simulation count needed for forming a timing library for circuits containing a large number of input/output paths, and reducing the time needed to generate the timing library. If the timing library generator device is making a timing library comprised of 4-bit register circuits, then a simulation is made of all operating conditions contained in the timing library, for just a portion of the 1 bit registers, and then forms the timing library from the timing constraint values or delay values obtained from those results, that also serve as other 1 bit register delay values and timing constraint values. This simulation performed on a portion of the 1 bit registers first of all performs a simulation for four of the 1 bit registers on a portion of operating conditions among the plurality of operating conditions included in the timing library, and then selects the largest timing constraint values and delay values found among these conditions.

In the technology that is disclosed in Japanese Unexamined Patent Application Publication No. Hei 9 (1997)-212541, the static timing verification unit implements a static timing verification using techniques in the related art by searching the first type block connection information, clock information, and data input timing information for the first type block. The test pattern generator unit generates an input test pattern for executing a dynamic timing verification on the second type block based on the static timing verification results and clock information. The dynamic timing verification unit then makes a dynamic timing verification based on the input test pattern for the second type block.

SUMMARY

The delay difference extraction method utilized in the hard macro characterization technique can be broadly grouped into static delay difference extraction and dynamic delay difference extraction described later on. Static delay difference extraction is capable of swiftly calculating the delay but has the problem of poor reliability. Dynamic delay difference extraction on the other hand has high reliability but also the problem that calculating the delay requires a long time.

As semiconductor integrated circuits become ever more highly integrated (higher circuit density), there is greater need for a characterization technique for extracting hard macro characteristics at high speed. However, even use of the inventions disclosed in the above mentioned five patent documents cannot provide a high-speed characterization technique.

In order to address the above problems, the present invention has the object of providing a characterization device and a computer program capable of extracting the characteristic values of high-reliability hard macros at high speed.

According to one aspect of the present invention, a characterization device is provided for extracting characteristic values of hard macros. A characteristic value extraction unit calculates the delay times at measurement points within the hard macro, and extracts the characteristic values by applying a slew to the signal waveform input to the hard macro, and making a static path search. The dynamic verification unit then verifies whether the characteristic value is satisfactory by making a dynamic verification of hard macros by utilizing the characteristic value extracted by the characteristic value extraction unit.

According to another aspect of the present invention, the dynamic verification unit is capable of shortening of shortening the time required for verifying whether the characteristic values are adequate or not by dynamically verifying the hard macro by utilizing the characteristic values that were extracted. This aspect of the invention is therefore capable of extracting the characteristic values of high-reliability hard macros at high speed.

BRIEF DESCRIPTION OF THE DRAWINGS

FIG. 10 is a drawing showing an example of the verification results when making a verification of the setup time FIG. 12 is a drawing showing the waveform for the WEN signal shown in FIG. 11A.

DETAILED DESCRIPTION OF THE PREFERRED EMBODIMENTS

The delay difference extraction method utilized in the characterization technique is generally broadly grouped into "static delay difference extraction" and "dynamic delay difference extraction" methods.

The static delay difference extraction method obtains delay values without making a simulation, and can for example make a path search based on connection information (net list). This static delay difference extraction method can operate at high speed because no simulation is made but is characterized by low reliability.

The dynamic delay difference extraction method on the other hand obtains delay values by executing a simulation. This dynamic delay difference extraction method requires a long time to execute a simulation but is characterized by high reliability.

The term simulation as referred to here is making a delay calculation on the gate level (cell units such as inverters, NAND gates, or flip-flops) or on the more detailed transistor level.

In the gate level simulation, each cell utilized in the semiconductor chip design is given delay information beforehand showing what extent a signal is delayed and output relative to an input, and the delay values (and other items) for that designed circuit are then calculated utilizing each cell's delay information.

In the transistor level simulation, a formula for calculating what extent of electrical current occurs in a transistor relative to parameters in that transistor operation such as gate voltage and drain voltage is given beforehand, and a calculation of the delay values (and other items) is then made utilizing those parameters. The transistor level simulation can therefore make accurate delay calculations compared to the gate level simulation but must handle a large processing load.

Terms such as static path search and dynamic verification are utilized hereafter however these terms are basically classified as static or dynamic according to whether or not the implement simulations described above are made.

Figure 1:
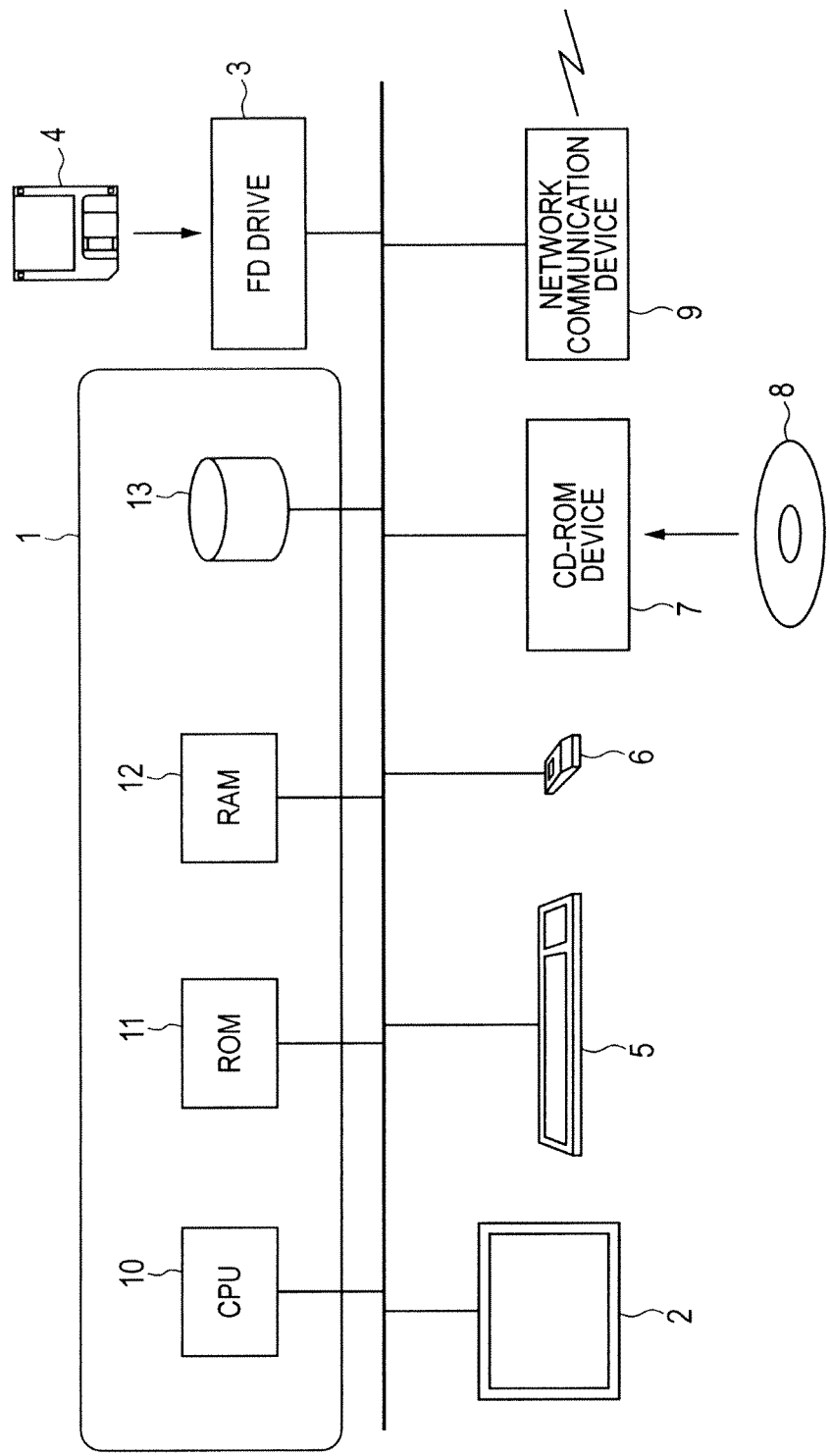
FIG. 1 is a block diagram showing a representative structure of the characterization device of the embodiment of the present invention.

FIG. 1 is a block diagram showing a typical structure of the characterization device of the embodiment of the present invention. The characterization device is comprised of a computer unit 1, a display device 2, and a FD drive 3 in which a FD (flexible disk) 4 drive is loaded, a keyboard 5, a mouse 6, and a CD-ROM device 7 in which a CD-ROM (compact disc-Read Only Memory) 8 is mounted, and a network communication device 9 all implemented on a general-purpose computer. The program for characterization of the hard macros is provided by a recording medium such as the FD 4 or the CD-ROM 8. The computer unit 1 executes the program to perform characterization of the hard macro. Moreover the program may also be supplied to the computer unit 1 by another computer via a communication line or cable.

The computer unit 1 is comprised of a CPU10, a ROM (Read Only Memory) 11, a RAM (Random Access Memory) 12 and a hard disk 13. The CPU 10 performs processing while inputting and outputting data between the display device 2, the FD drive 3, the keyboard 5, the mouse 6, the CD-ROM device 7, the network communication device 9, the ROM 11, RAM 12 or the hard disk 13. The program recorded on the FD4 or the CD-ROM 8 is stored on the hard disk 13 from the CPU 10 by way of the FD drive 3 or the CD-ROM device 7. The CPU 10 performs characterization of the hard macro by loading the appropriate program from the hard disk 13, on the RAM 12 and executing that program.

Figure 2:
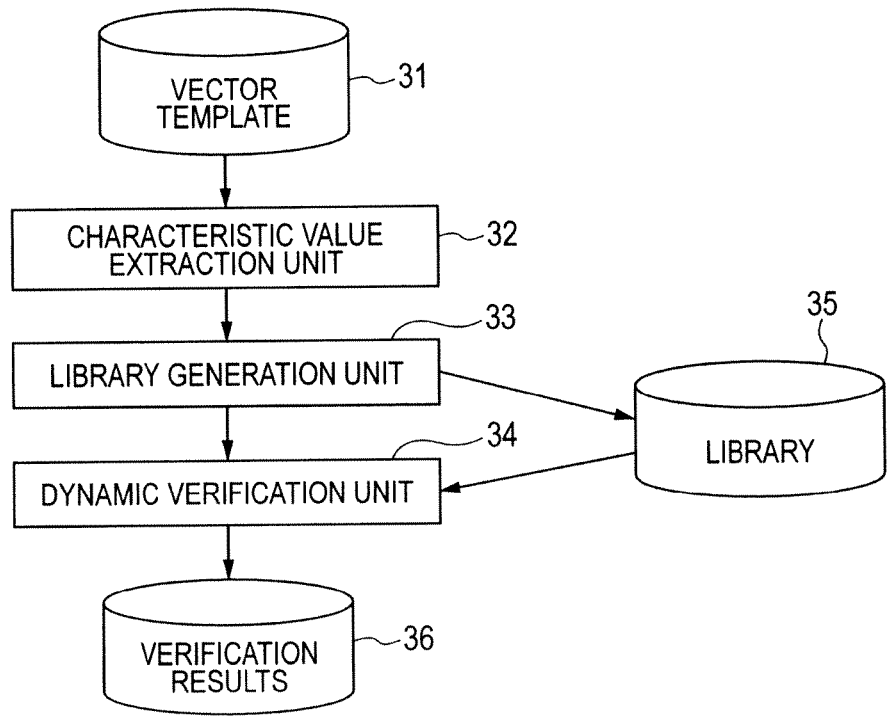
FIG. 2 is a block diagram showing the functional structure of the characterization device of the embodiment of the present invention.

FIG. 2 is a block diagram showing the functional structure of the characterization device of the embodiment of the present invention. The characterization device of the present embodiment is implemented by a program executed on a computer shown in FIG. 1. The program is comprised of a vector template storage file 31, a characteristic value extraction unit 32, a library generation unit 33, a dynamic verification unit 34, a library storage file 35, and a verification result storage file 36.

The characteristic value extraction unit 32 creates a simulation input file using a vector template stored in the vector template storage file 31, and performs a static path search. The characteristic value extraction unit 32 then extracts the characteristic values of the hard macro such as the setup time, the hold time and the delay time. The vector template is a template for setting a value to add a desired slew to the signal waveform and generating a signal waveform offset just by the desired setup time and hold time.

The library generation unit 33 generates a table for the setup time and the hold time from the characteristic values extracted by the characteristic value extraction unit 32, and stores this table as a library in the library storage file 35.

The dynamic verification unit 34 searches the library stored in the library storage file 35, extracts the setup time and hold time, makes a dynamic verification, and stores the verification results in the verification result file 36.

Figure 3:
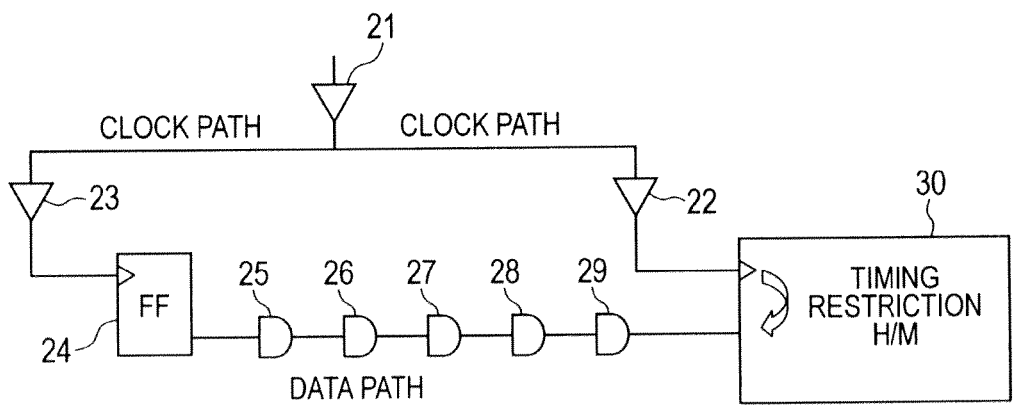
FIG. 3 is a diagram showing an example of a circuit including a hard macro for characteristic extraction by the characterization device of the embodiment of the present invention.

FIG. 3 is a diagram showing one example of a circuit including a hard macro for characteristic extraction by the characterization device of the embodiment of the present invention. This circuit includes the buffers 21 through 23, the flip-flop 24, the AND circuits 25 through 29, and the hard macro (H/M) 30.

Most of the static timing analysis units utilized in signoff verification of the semiconductor product are among Latch to Latch units. In the circuit structure where the flip-flop 24 outputs are input to the hard macro 30 after passing through the AND circuit 25 through 29, the hard macro 30 is often the terminal point as shown in FIG. 3. Extracting the hard macro 30 timing constraints at high-speed and high accuracy and eliminating the margin from the library is therefore important.

Figure 4:
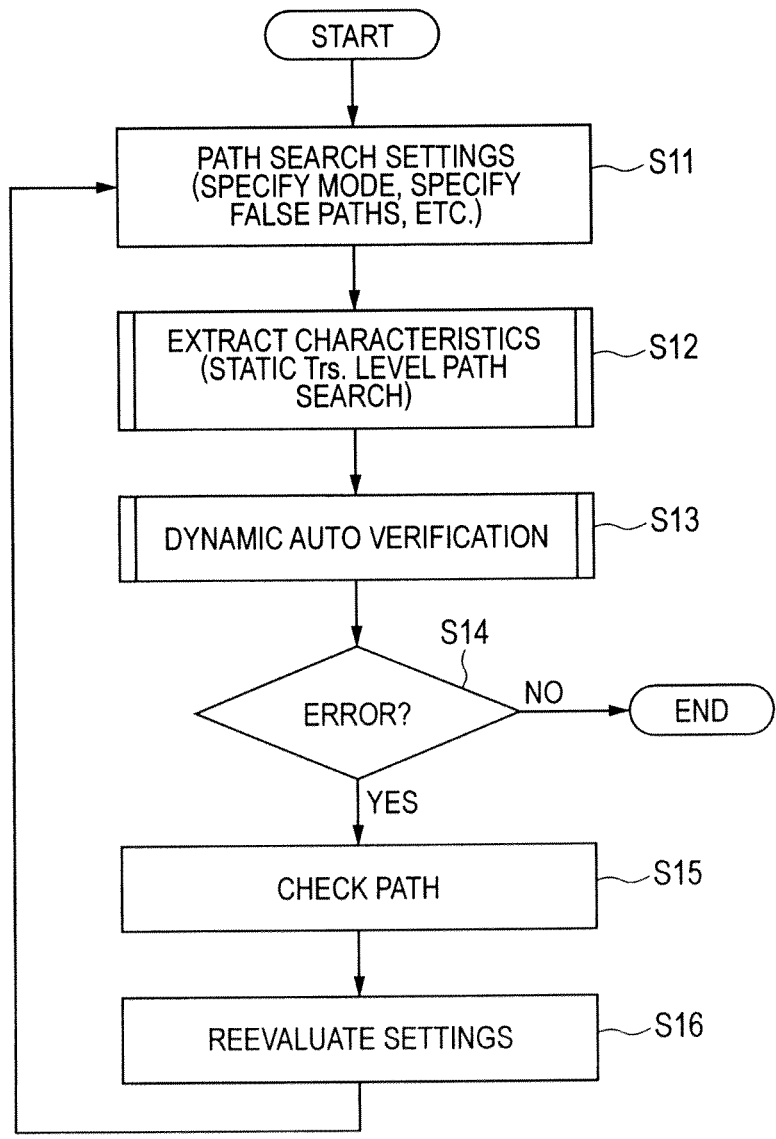
FIG. 4 is a flow chart for describing the process procedure for making a path search using the characterization device of the embodiment of the present invention.

FIG. 4 is a flow chart for describing in detail the process procedure for making a path search using the characterization device of the embodiment of the present invention. The following example describes the case where the hard macro 30 is an SRAM.

First of all the operator or other person specifies the mode, specifies the false path, and makes the path search settings (S11). The term mode setting here signifies setting the operation mode for the SRAM which includes the read mode and write mode. The false path designation signifies specifying a path for making the path search.

Next, the characteristic value extraction unit 32 makes a static path search and extracts the characteristics. The library generation unit 33 then generates a library from the characteristic values extracted by the characteristic value extraction unit 32 and stores it in the library storage file 35 (S12). This static path search is a path search on the static transistor level and is described later on in detail The characteristics extracted here are described as the setup time, hold time, and delay time, etc.

Next, the dynamic verification unit 34 make a dynamic auto verification using the library generated by the library generation unit 33 and judges whether or not there is an error in those verification results (whether or not there is an NG) (S14). If there is no error (S14, No), then the process ends.

If an error is found (S14, Yes) then the operator or other person checks the path (S15), reviews and evaluates path search settings (S16). Errors for example that are sections prone to mistaken detection such as gated, through-latches and custom topology are extracted, a dynamic auto verification error decision is added to the status of these sections, and these are specified in the false path. Accurate setting corrections are made in this way by checking the actual operation status.

The process from step S11 onwards is then repeated until there are no more errors. This process yields corrected information from the path check and the dynamic verification results so the repetition count is reduced and nearly always ends in one try.

Figure 5:
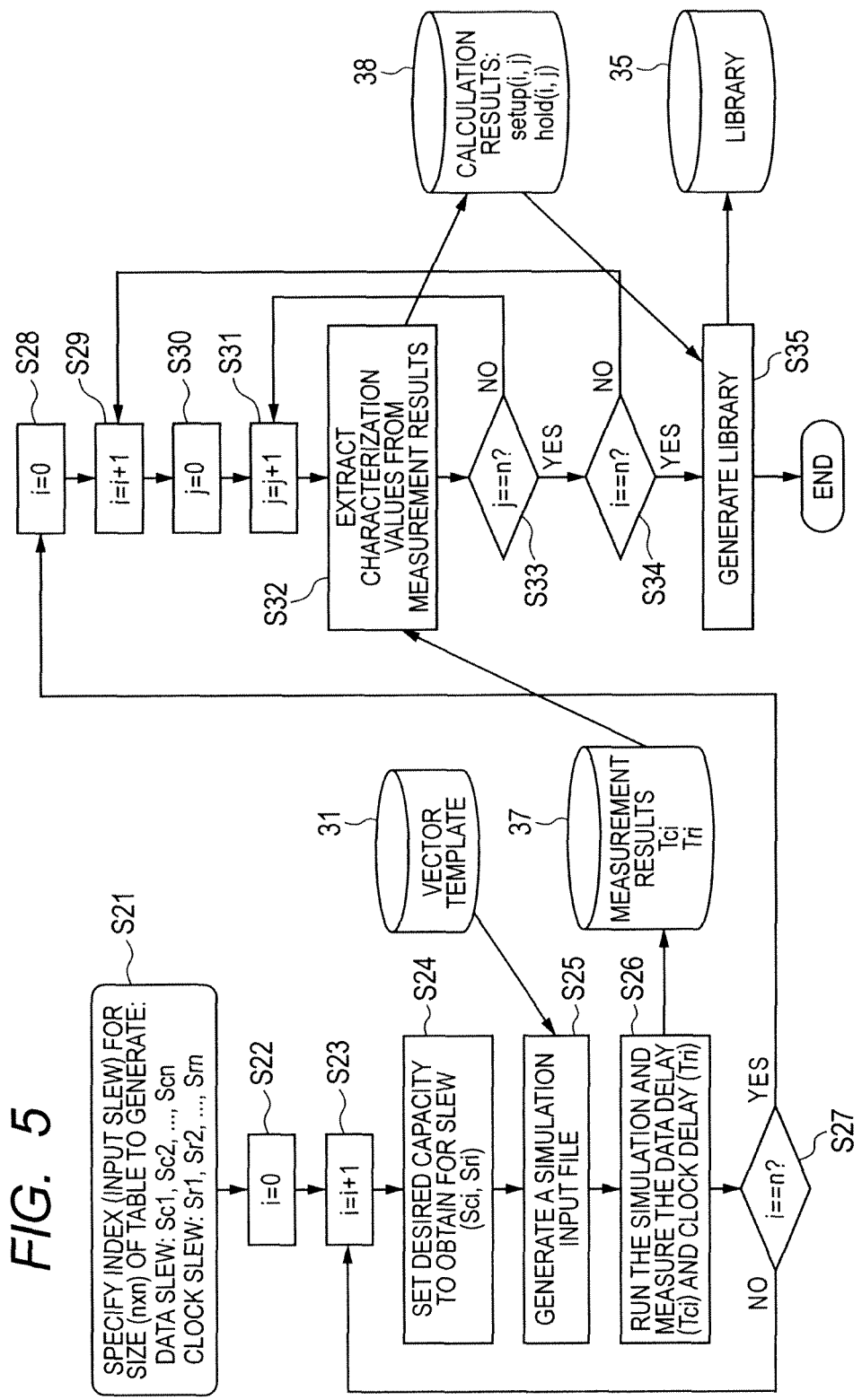
FIG. 5 is a flow chart for describing in detail the extract characteristics process procedure S12 shown in FIG. 4.

FIG. 5 is a flow chart for describing in detail the extract characteristics process procedure (S12). First of all, in this process, the index (input slew) is specified for the table size (n×n) generated by the user (S21). Here the data slew is set as Sc1-Scn, and the clock slew as Sr1 through Srn.

The characteristic value extraction unit 32 sets a "0" into the variable i (S22), and increments the variable i (S23). The characteristic value extraction unit 32 then sets the capacity (S24) for obtaining the desired slew (Sci, Sri).

The delay value changes due to the slope (slew) of the input signal waveform. Obtaining accurate delay values requires attaching various slews to the data and clock signal waveforms and inputting those into the hard macro 30. To obtain the various slews the required capacitance values are set in advance, and the desired slew is applied to the signal waveform by changing those capacitance values.

The template stored in the vector template storage file 31 is made to apply capacitance values in order to give the desired slew to the signal waveform. The characteristic value extraction unit 32 sets the capacitance values for obtaining the desired slews (Sci, Sri) into the template in order to create the simulation input file (S25).

Next, the characteristic value extraction unit 32 utilizes the generated simulation input file to execute a simulation and measures the data delay (Tci) and the clock delay (Tri), and stores the measurement results in the measurement result storage file 37 (S26).

Figure 6:
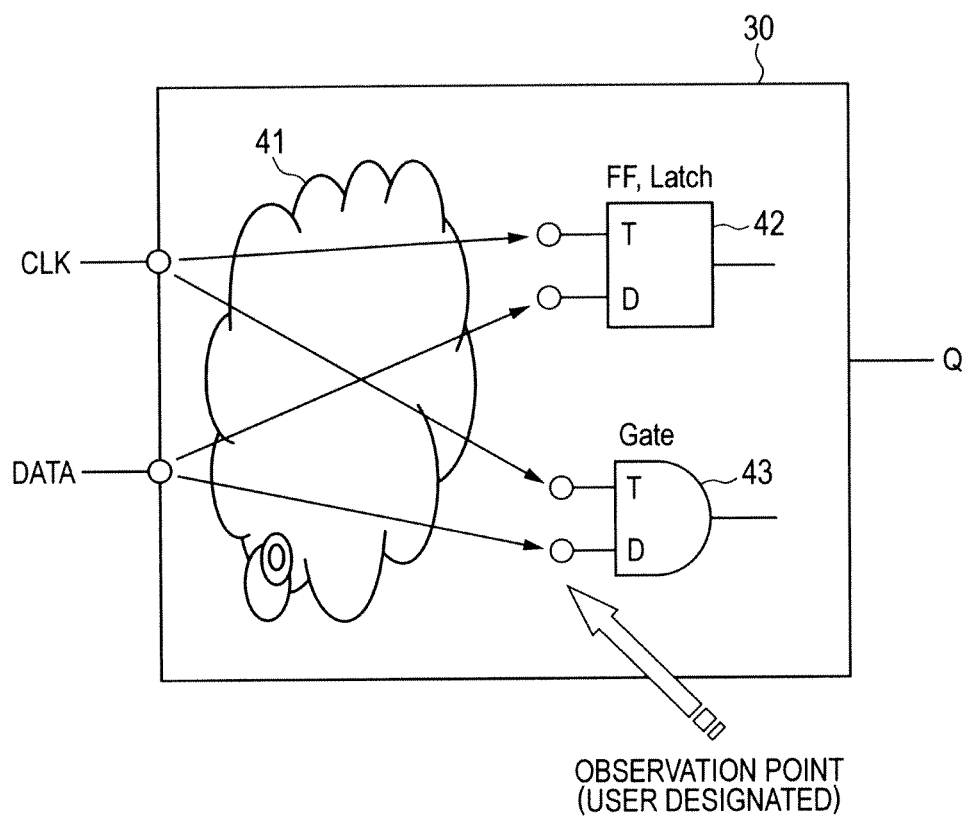
FIG. 6 is a diagram for describing the data delay (Tci) and the clock delay (Tri) of the hard macro.

FIG. 6 is a diagram for describing the data delay (Tci) and the clock delay (Tri) of the hard macro 30. In the hard macro 30 shown in FIG. 6, the data (DATA) and clock (CLK) are input by way of the combination circuit 41 into the flip-flop/latch 42 and the gate 43. The data delay (Tci) and clock delay (Tri) for measurement points specified by the user are measured in step S26.

If there are a plurality of paths to the measurement points from the data (DATA) and clock (CLK) serving as the external terminals, then the data delay (Tci) and the clock delay (Tri) are measured for each path.

The characteristic value extraction unit 32 next decides whether the variable i is equivalent to n or not (S27). If the variable i is smaller than n, then the decision is (No in S27) and the processing from steps S23 through S26 is repeated until the variable i is equivalent to n.

If the characteristic value extraction unit 32 decides that the variable i is equivalent to n (S27, Yes), then the characteristic value extraction unit 32 substitutes a "0" into the variable i (S28), and increments the variable i (S29). The characteristic value extraction unit 32 substitutes a "0" into the variable j (S30) and increments the variable j (S31).

The characteristic value extraction unit 32 next loads the measurement results (Tci, Trj) from the measurement results storage file 37, calculates the setup time and hold time serving as the characteristics values, and stores them into the calculation result storage file 38 (S32). The method for calculating the setup time and hold time is described briefly here.

If there is a plurality of paths from the data (DATA) to the measurement point, then the maximum delay value for these paths is set as Max (Tci) and the minimum delay value is set as Min (Tci). If in the same way, there is a plurality of paths from the clock (CLK) to the measurement point, then the maximum delay value on these paths is set as Max (Tri) and the minimum delay value is set as Min (Tri). When the correction coefficient is set to ocv to account for irregularities in delay, then the setup time (setup) and hold time (hold) can be calculated by the following formula.

$$\mathrm{setup}(i, j) = \mathrm{Max}(Tci) \times (1+ocv) - \mathrm{Min}(Tri) \times (1-ocv) \quad \text{Formula (1)}$$

$$\mathrm{hold}(i, j) = \mathrm{Max}(Tri) \times (1+ocv) - \mathrm{Min}(Tci) \times (1-ocv) \quad \text{Formula (2)}$$

The characteristic value extraction unit 32 next decides if the variable j is equivalent to n or not (S33). If the variable j is not equivalent to n (No in S33) then the characteristic value extraction unit 32 repeats the processing in steps S31 through S32. If the variable j is equivalent to n (Yes in S33) then the characteristic value extraction unit 32 decides whether the variable i is equivalent to n or not (S34). If the variable i is not equivalent to n (No in S34) then the processing in steps S29 through S33 is repeated.

If the variable i is equivalent to n (Yes in S34) then the library generation unit 33 generates a setup table showing the correspondence between the data slew, clock slew, and the setup time; and a hold table showing the correspondence between the data slew, the clock slew, and the hold time, and stores these as a library in the library storage file 35 (S35) and terminates the processing.

Figure 7:
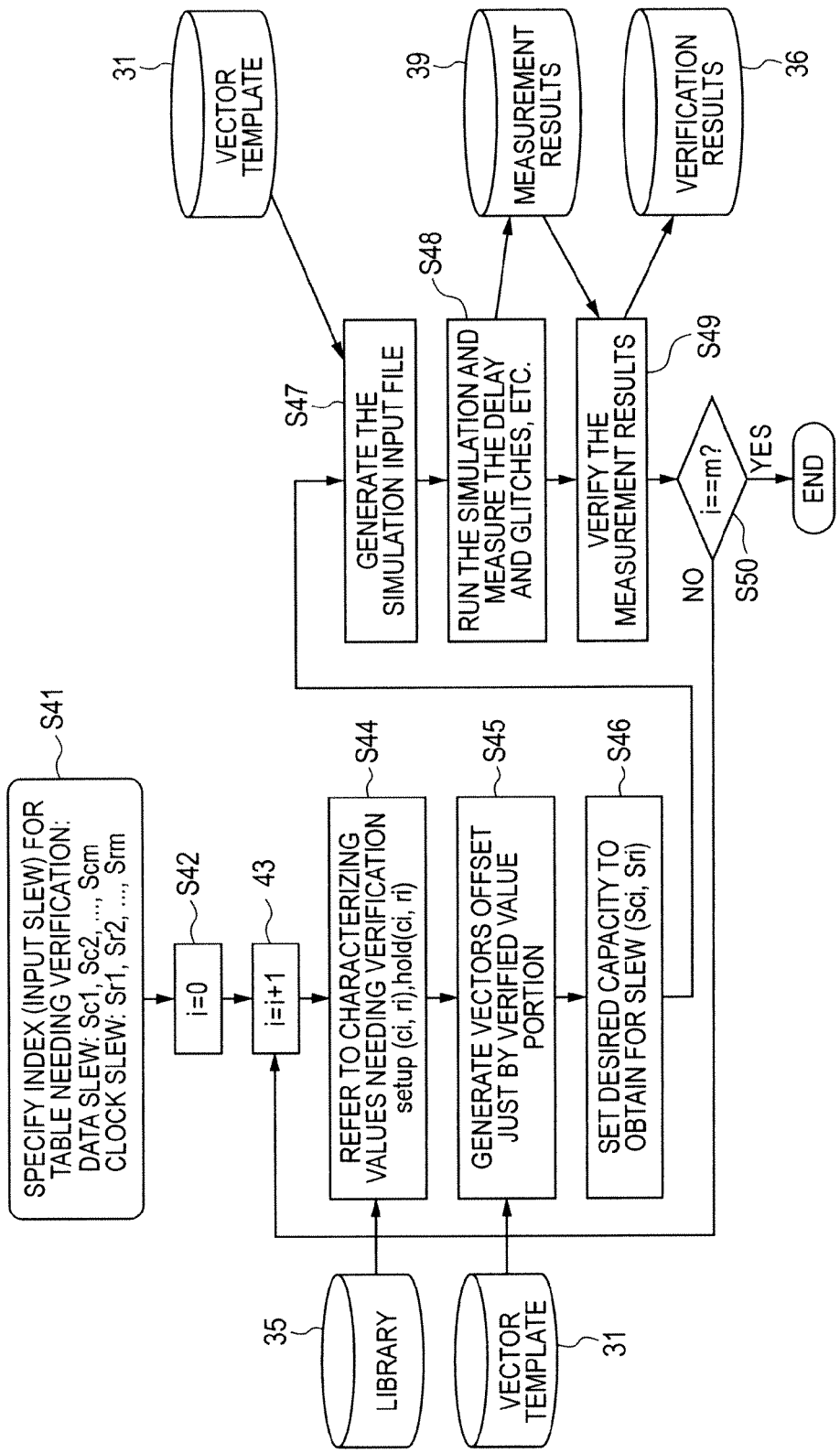
FIG. 7 is a flow chart for describing in detail the dynamic auto verification process (S13) shown in FIG. 4.

FIG. 7 is a flow chart for describing in detail the dynamic auto verification process (S13) shown in FIG. 4. First of all, the dynamic verification unit 34 specifies the index (input slew) for the table that the user wants to verify (S41). Here, the data slew for the table the user wants to verify is set as Sc1 through Scm, and the clock slew is set as Sr1 through Srm.

Next, the dynamic verification unit 34 sets a "0" in the variable i (S42), and increments the variable i (S43). The dynamic verification unit 34 then searches the library storage file 35, and extracts the setup time setup (ci, ri) and the hold time hold (ci, ri) serving as the characteristic values the user wants to verify (S44).

Next, the dynamic verification unit 34 searches the vector template storage file 31, and generates a signal waveform (vector) that is offset just by the setup time setup (ci, ri) and the hold time hold (ci, ri) serving as the characteristic values (S45).

Figure 8:
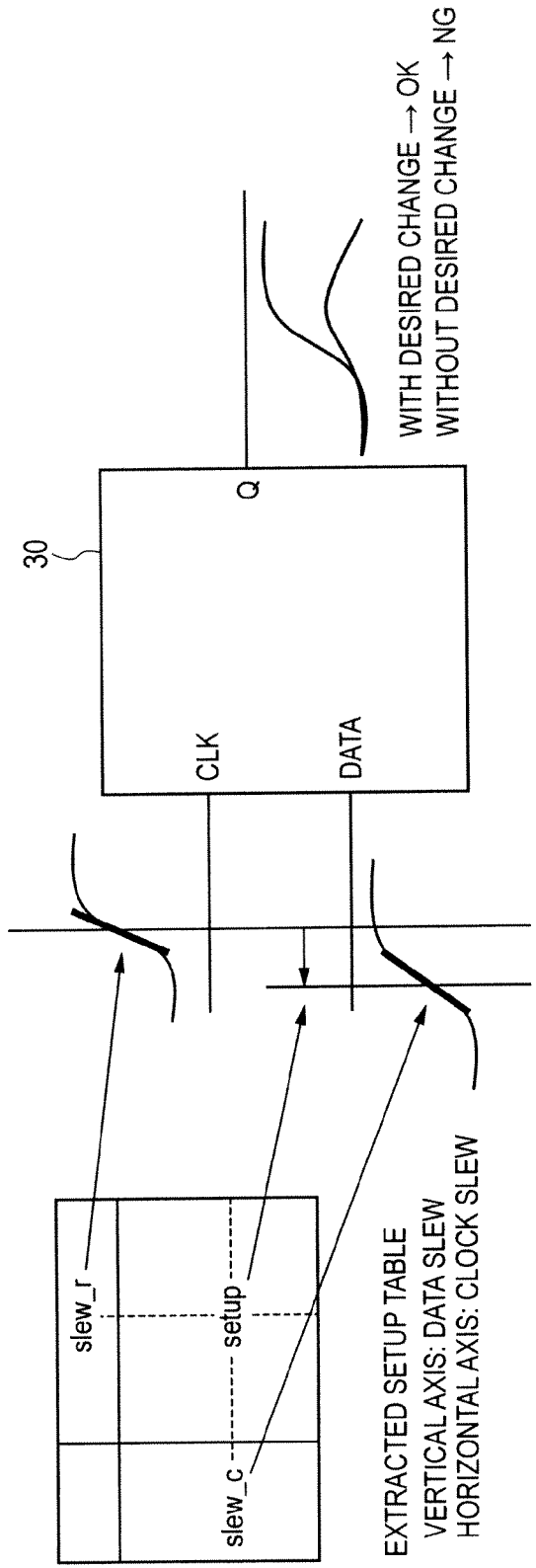
FIG. 8A and FIG. 8B are drawings for describing the generation of the vector shown in step S45.

FIG. 8A and 8B are drawings for describing the generating of the vector shown in step S45. The dynamic verification unit 34 searches the setup table stored in the library storage file 35, and extracts the setup time corresponding to the data slew Sci and the clock slew Sri.

FIG. 8A is a drawing showing one example of the setup table and shows the extracting of the setup time corresponding to the data slew Sci (slew_c) and the clock slew Sri (slew_r).

Next, when verifying the setup time, as shown in FIG. 8B the dynamic verification unit 34 generates a waveform where the data (DATA) is offset forward just by the setup time, relative to the clock (CLK) waveform, and sets this as the vector. Also, when verifying the hold time, the dynamic verification unit 34 generates a waveform with the data (DATA) offset rearward just by the hold time, relative to the clock (CLK) waveform and sets this as the vector.

The dynamic verification unit 34 next sets the capacitance that should be attached to the data (DATA) and clock (CLK) in order to obtain the desired slew (Sci, Sri) as shown in FIG. 8B (S46).

Figure 9:
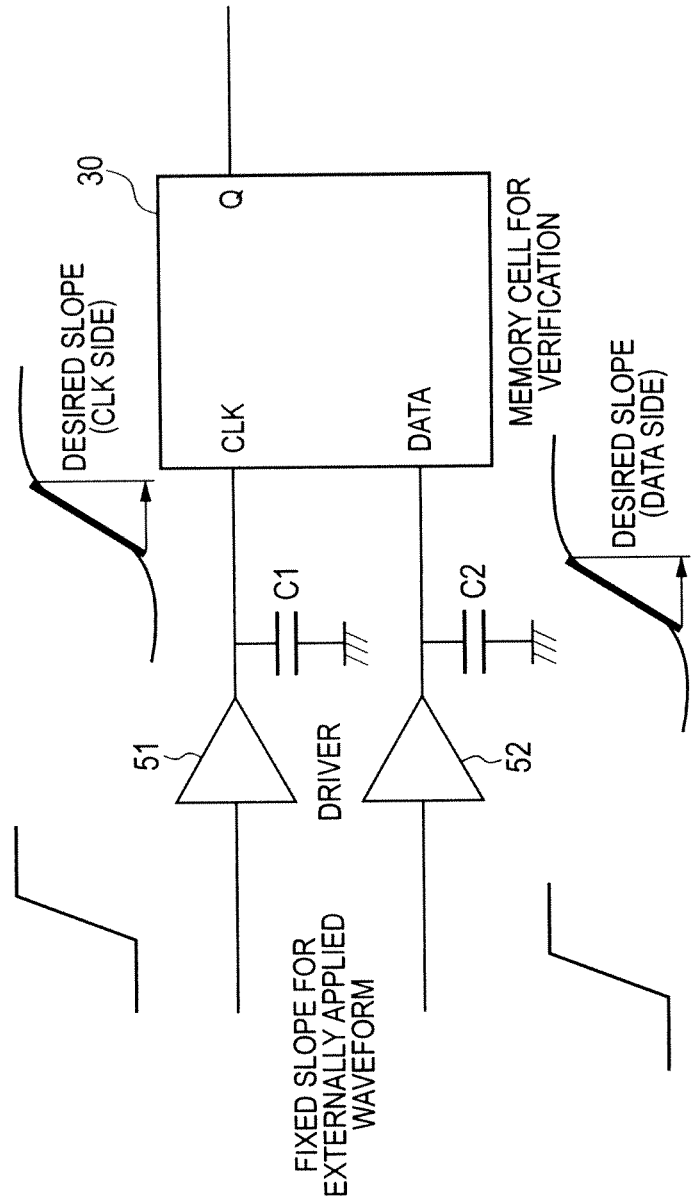
FIG. 9 is drawing for describing a method for applying the desired slew to the data (DATA) and clock (CLK)

FIG. 9 is drawing for describing a method for applying the desired slew to the data (DATA) and clock (CLK). As shown in FIG. 9, the data (DATA) and the clock (CLK) slopes cannot be controlled when the drivers 51 and 52 are coupled to the input of the hard macro 30 as shown in FIG. 9. The dynamic verification unit 34 therefore adds a capacitance C1 and C2 to the output of the drivers 51 and 52, and obtains data and clock pulses with the desired slope by varying the capacitances C1 and C2.

The dynamic verification unit 34 searches the vector template storage file 31 and generates a simulation input file to attain a waveform possessing a delay value and slope as shown in FIG. 8B in the data and the clock input to the hard macro 30 (S47).

The dynamic verification unit 34 next executes a simulation for the hard macro 30 by utilizing the simulation input file, and store the measurement results such as the glitch (spike) and delay time of the output signal into the measurement result storage file 39 (S48).

The dynamic verification unit 34 then searches the measurement result storage file 39, verifies the measurement results, and stores the verified results in the verification result storage file 36 (S49). If for example verifying the setup time, then the dynamic verification unit 34 decides whether or not the data was correctly retained at the clock pulse edge, whether or not a spike was made, and whether or not the pulse width was satisfactory or not, etc.

FIG. 10 is a drawing showing an example of the verification results when making a verification of the setup time. If results from inputting a clock offset from the data just by the setup time into the hard macro 30 and executing a simulation, yield the desired changes within the hard macro 30 then an "OK" is judged as the verification result. If the desired change did not occur within the hard macro 30 then an "NG" is judged as the verification result.

Moreover, if no spike was generated within the hard macro 30, then the dynamic verification unit 34 judges an "OK" as the verification result. If a spike did occur within the hard macro 30 then an "NG" is judged as the verification result.

If there is an ample pulse width within the hard macro 30 then the dynamic verification unit 34 judges an "OK" as the verification result. If the pulse width within the hard macro 30 is inadequate then an "NG" is judged as the verification result.

When verifying the hold time, the dynamic verification unit 34 judges whether the previous data is correctly retained or not at the clock rising edge, whether or not a spike is occurring, and whether or not the pulse width is sufficient.

Finally, the dynamic verification unit 34 judges whether or not the variable i is equivalent to m or not (S50). If the variable i is not equivalent to m (No in S50) then the process returns to step S43 and the process from there onwards is repeated. If the variable i is equivalent to m (Yes in S50) then the processing is terminated.

Figure 11A:
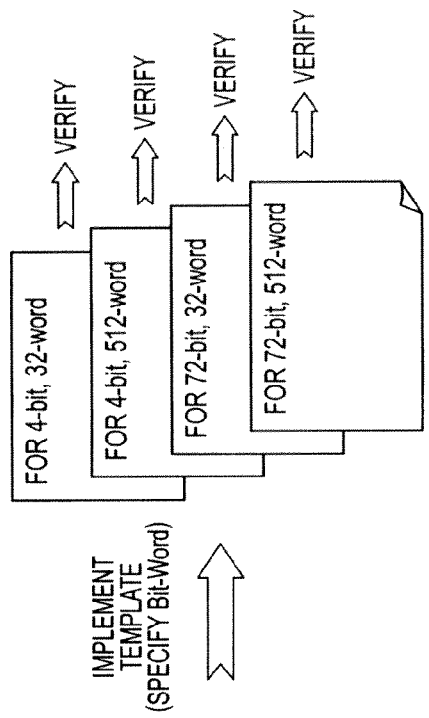
FIG. 11A and FIG. 11B are drawings showing an example of the vector template for storing the vector template storage file.

FIG. 11 is a drawing showing an example of the vector template stored in the vector template storage file 31. In FIG. 11A the vector is a section describing each input signal pattern and that defines the clock (CLK), chip enable (CEN), write enable (WEN) and address (A[@ADDR]) input patterns. The @ADDR specifies the address width, and is utilized when deploying the template.

FIG. 12 is a drawing showing the waveform for the WEN signal shown in FIG. 11A. The "N" for the template shown in FIG. 11A indicates the change from "0" to "1" within the period; and the "P" shows the change from "1" to "0" within the period. Therefore, the WEN signal for the template as shown for example in FIG. 11A forms the waveform as shown in FIG. 12

The measurement specifier is a descriptor for measuring the delay and glitch at measurement points within the net list. The yod[@BIT] is a descriptor for measuring the delay time at the output terminal serving as the measurement point. Here, the clock (CLK) is utilized as a trigger for measuring the output terminal Q [@BIT] delay time. The @BIT indicates the data width, and is used during template deployment.

Here, yrd[@ADDR] is a descriptor for measuring the delay time with the intermediate node serving as the measurement point. The clock (CLK) is utilized as a trigger for measuring the intermediate node X0. X1. T[@ADDR] delay time.

The yg0[@ADDR] is a descriptor for measuring the glitch of the intermediate node, and measures the glitch of the intermediate node X0. X1. D[@ADDR]. The numerals listed at the extreme right of the specifier for measuring indicate the period, however these numerals are not directly related to the present invention so a detailed description is omitted here.

The calculation specifier is a descriptor for verifying (OK/NG judgment) the measurement results by performing the four arithmetic operations. The CHECK (SUB (MUL (delay0, 1.1), yod[@BIT]), LE), a specifier for judging if the yod[@BIT]) serving as the delay time for the output terminal Q[@BIT] is a delay 0×1.1 or less.

The CHECK (SUB (MUL (delay1, 1.1), yrd [@ADDR]), LE) is a descriptor for judging if the yrd[@ADDR] serving as the delay time for the intermediate node is a delay 1×1.1 or less.

The CHECK (SUB (0.2, yg0), GE) is a descriptor for judging if the glitch width of the intermediate node is 0.2 or more. The various verifications per the measurement point are made in this way by performing four arithmetic operations.

Figure 11B:
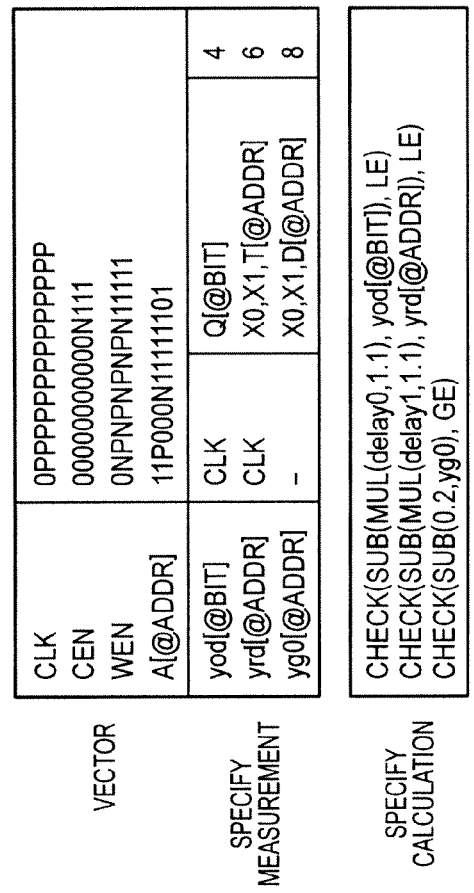

FIG. 11B is a drawing showing an example of deployment of the vector template (stored in the vector template storage file). If the hard macro is a SRAM, then the template must be capable of flexibly changing the SRAM bit width and word count. A simulation input file group corresponding to that bit width and word count is therefore automatically generated in the @BIT and the @ADDR of the template shown in FIG. 11A by deploying a template to set the appropriate values in the bit width and word count. The dynamic verification unit 34 then utilizes this simulation input file group to perform the verification.

In the characterization device of the embodiment as described above, the characteristic value extraction unit 32 extracts the characteristic values of the hard macro by performing a static path search, and the dynamic verification unit 34 makes a dynamic verification of the extracted characteristic values so that by deciding if the extracted characteristic values are correct or not, the characteristic values of high-reliability hard macros can be extracted at high speed.

Moreover if an error occurred during verification of the characteristic values then the settings can be revised by making a manual patch check, so that a decision can be made on whether or not an error occurred in sections prone to false searches, and the path search can be easily reset.

A simulation input file group is easily generated by deploying a template so that a verification can be made of SRAM possessing an optional bit width and word count can be made.

Complicated verifications to determine whether measurement results are correct or not can be performed utilizing criterion formula that are simple arithmetic operations so that the user can easily verify the characteristic values by forming a simple criterion formula.

The invention can verify the characteristic values with high accuracy because the dynamic verification unit 34 decides whether the characteristic values are correct or not by way of the pulse width and the glitch within the hard macro 30.

Further, an optional capacitance can be applied to the output of the driver coupled to the input of the hard macro 30 so that a dynamic verification can be made with higher accuracy by applying an optional slope to the signal waveform input to the hard macro 30.

The embodiment disclosed above should not be considered as limited by any point in the above examples. The scope of the present invention is shown by the range of the claims and not by the above description, and intentionally includes all manner of changes within a range and meaning equivalent to the range of the patent claims.

What is claimed is:

1. A characterization device comprising:
a characteristic value extraction unit configured to calculate a delay time at each measurement point within a hard macro and to extract characteristic values of the hard macro by applying a slew to a signal waveform that is inputted to the hard macro and making a static path search, the characteristic values including a setup time and a hold time of the hard macro; and
a dynamic verification unit configured to verify whether the characteristic values are adequate or not by making a dynamic verification of the hard macro utilizing the characteristic values extracted by the characteristic value extraction unit,
wherein the characteristic value extraction unit measures the delay times at a plurality of paths to the data holding circuit within the hard macro by applying a slew to the signal waveform that is inputted to the hard macro, makes a static path search, and calculates the setup and hold times of the data holding circuit from the maximum value and the minimum value of the delay time on the paths to extract the characteristic values.

2. The characterization device according to claim 1, wherein the characteristic value extraction unit calculates a plurality of setup and hold times by applying a plurality of slews to the data and the clock inputted to the hard macro and making a static path search, and retains the setup time and the hold time corresponding to the data slew and the clock slew combination as a table, and
wherein the dynamic verification unit searches the table retained by the characteristic value extraction unit, and performs a dynamic verification of the hard macro.

3. The characterization device according to claim 2, wherein the dynamic verification unit performs a simulation in which data inputted to the hard macro is offset relative to the clock just by the setup time or the hold time calculated by the characteristic value extraction unit, and verifies if the characteristic value is adequate according to whether the output is the expected value or not.

4. The characterization device according to claim 3, wherein the dynamic verification unit performs a simulation to verify whether the characteristic values are adequate by whether or not glitches occur inside the hard macro.

5. The characterization device according to claim 3, wherein the dynamic verification unit performs a simulation to verify whether the characteristic values are adequate by whether or not the pulse width within the hard macro are a specified value or higher.

6. The characterization device according to claim 5, wherein the dynamic verification unit performs a dynamic verification of the hard macro based on a simulation input file made according to values set into a template.

7. The characterization device according to claim 5, wherein the dynamic verification unit generates a criterion formula by four arithmetical operations according to values set into a template and verifies whether the characteristic values are adequate or not according to the applicable criterion formula.

8. The characterization device according to claim 7, wherein the dynamic verification unit applies a slew by attaching a capacitance to the output of the driver coupled to the input of the hard macro.

* * * * *